United States Patent
Uefune et al.

(10) Patent No.: US 8,196,284 B2
(45) Date of Patent: Jun. 12, 2012

(54) MANUFACTURING METHOD OF BASE AND MANUFACTURING METHOD OF DISK DRIVE DEVICE

(75) Inventors: Kouki Uefune, Kanagawa (JP); Takako Hayakawa, Kanagawa (JP); Yoshiyuki Hirono, Kanagawa (JP); Masaru Muranishi, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 292 days.

(21) Appl. No.: 12/381,879

(22) Filed: Mar. 16, 2009

(65) Prior Publication Data

US 2009/0241322 A1    Oct. 1, 2009

(30) Foreign Application Priority Data

Mar. 31, 2008    (JP) ................. 2008-094314

(51) Int. Cl.
*G11B 5/127* (2006.01)
*G11B 5/012* (2006.01)
*G11B 17/00* (2006.01)
*G11B 33/00* (2006.01)
*H04R 31/00* (2006.01)

(52) U.S. Cl. ............... 29/603.03; 360/97.01; 369/75.11

(58) Field of Classification Search .............. 29/603.03, 29/603.04, 603.07; 360/97.01, 97.02, 97.03; 369/75.11
See application file for complete search history.

(56) References Cited

U.S. PATENT DOCUMENTS

| | | | | |
|---|---|---|---|---|
| 5,105,529 A * | 4/1992 | Yasar et al. | ............... | 29/603.04 |
| 6,462,901 B1 * | 10/2002 | Tadepalli | ............... | 360/97.03 |
| 6,507,992 B1 * | 1/2003 | Jenkins et al. | ............... | 29/603.03 |
| 6,542,327 B2 * | 4/2003 | Takaike | ............... | 360/97.02 |
| 6,665,139 B2 * | 12/2003 | Tokuyama et al. | ............... | 360/97.02 |
| 6,751,050 B1 * | 6/2004 | Tokuyama et al. | ............... | 360/98.01 |
| 6,922,308 B1 * | 7/2005 | Butler | ............... | 360/97.02 |
| 7,283,324 B2 * | 10/2007 | Sasaki | ............... | 360/97.03 |
| 7,505,860 B2 * | 3/2009 | Herdendorf et al. | ............... | 702/108 |
| 7,559,132 B2 * | 7/2009 | Sri-Jayantha et al. | ..... | 29/603.03 |

FOREIGN PATENT DOCUMENTS

| | | |
|---|---|---|
| JP | 62/175986 | 8/1987 |
| JP | 08/161881 | 6/1996 |
| JP | 2000-040340 | 2/2000 |
| JP | 2000-322870 | 11/2000 |
| JP | 2001-338483 | 12/2001 |
| JP | 2004/171713 | 6/2004 |
| JP | 2004-171713 | 6/2004 |
| JP | 2007/280555 | 10/2007 |
| JP | 2007-280555 | * 10/2007 |

OTHER PUBLICATIONS

US 6,091,569, 07/2000, Allsup et al. (withdrawn)*

* cited by examiner

*Primary Examiner* — David Angwin

(57) ABSTRACT

Embodiments of the present invention help to effectively suppress vibration of the disk in a Hard Disk Drive (HDD) with low density gas sealed therein, and securely prevent leakage of the low density gas from the base. In an embodiment, helium gas is sealed in a hermetically sealed enclosure of an HDD, and a shroud is formed integrally with a base. In manufacturing the base, a magnetic disk facing surface of the shroud is shaped by cutting after die-casting. This accomplishes a small and precise size of the gap between the magnetic disk facing surface and the circumferential edge of the disk. Cutting the shroud formed independently from the exterior walls, which ensure the hermeticity with the shroud, suppresses the vibration of the magnetic disk and eliminates the necessity of cutting of the inner surfaces of the exterior walls for the purpose of suppression of the vibration to reduce the risk of helium leakage.

4 Claims, 6 Drawing Sheets

MANUFACTURING METHOD OF BASE AND MANUFACTURING METHOD OF DISK DRIVE DEVICE

CROSS-REFERENCE TO RELATED APPLICATION

The instant nonprovisional patent application claims priority to Japanese Patent Application No. 2008-094314 filed Mar. 31, 2008, and which is incorporated by reference in its entirety herein for all purposes.

BACKGROUND OF THE INVENTION

Hard Disk Drives (HDDs) spin magnetic disks and drive head gimbal assemblies (HGAs) at high speed in response to requests for larger capacity, higher recording density, and higher-speed accessing. As a result, some instability of air (turbulence) arises to buffet the magnetic disks and the HGAs.

This turbulence buffeting can become a big disturbance in positioning heads for data recorded on a magnetic disk with high density. This is because that the turbulence occurs at random and it is difficult to estimate its magnitude and cycle so that swift and accurate positioning control becomes complex and difficult. The turbulence buffeting may cause noise and impair the quietness of the device.

Another problem caused by influence of the air inside the device due to the high speed spin of the disk, is increased electric power consumption. When the magnetic disk is spun at a high speed, the air around the disk is drawn and spun together. In contrast, the air away from the magnetic disk remains still, so that shearing force arises between them to become a load against the spin of the disk. This is called windage loss, which becomes greater as the disk spins at a higher speed. To spin the magnetic disk at high speed against this windage loss, a motor will require a greater power output and more electric power.

To suppress the flutter vibration of a magnetic disk caused by turbulence, an idea has been proposed to disposes a shroud in the vicinity of the circumferential edge of the magnetic disk (for example, refer to Japanese Patent Publication No. 2000-322870 "Patent Document 1"). A smaller gap between the shroud and the outer periphery of the magnetic disk reduces turbulence of the swirling flow caused by spins of the magnetic disk to reduce the flutter vibration of the magnetic disk.

In addition, focusing on the fact that the air turbulence and the windage loss are proportional to the density of the gas inside the device, an idea has been proposed to enclose a low density gas instead of air in a hermetically sealed HDD to reduce the air turbulence and the windage loss. Hydrogen, helium, and the like may be examples of the low density gas, but helium is optimum since it is effective, stable, and safe in considering the actual use. An HDD with helium gas sealed therein can overcome the above problems and achieve swift and accurate positioning control, power saving, and satisfactory quietness.

However, helium has very small molecules and a large diffusion coefficient. Therefore, there has been a problem that an enclosure used in a common HDD is sealed so poorly that the helium gas leaks out easily. In order to make it possible to seal in low density gas such as helium gas, a technique in the Japanese Patent Publication No. 2007-280555 ("Patent Document 2") has been proposed.

To suppress the flutter vibration of the magnetic disk caused by turbulence in an HDD with helium gas sealed therein, it is preferable to reduce the gap between the circumferential edge of the magnetic disk and the wall facing the circumferential edge as much as possible. If a shroud is provided to suppress the flutter vibration of the magnetic disk, it is necessary that the shroud's side which faces the magnetic disk be positioned with high precision to reduce the gap between the shroud and the magnetic disk.

However, as in the technique disclosed in the Patent Document 1, if a shroud is provided as a component different from a base, it is difficult to dispose the shroud within the base with high positioning precision. Since the track pitch of current magnetic disks is very small, if there is such an error in positioning of the shroud, it is difficult to suppress the flutter vibration of the magnetic disks to be small enough for highly accurate head positioning.

To obtain a high precision in positioning the shroud, it is preferable to form the shroud integrally with the base. For example, the exterior wall of the base can be used as a shroud. Forming the exterior wall of the base thicker and the inner surface thereof to be curved around the circumferential edge of the magnetic disk achieves a smaller gap between the circumferential edge of the magnetic disk and the inner surface of the exterior wall.

Typically, the base is made by die-casting with aluminum alloy. Die-casting, however, does not exhibit very high processing accuracy. Besides, a draft angle is required to take a casting out of a mold. Thus, if a plurality of magnetic disks are present, the gap between the inner surface of the exterior wall and the circumferential edge of each magnetic disk is different in size depending on the position of the magnetic disk.

Accordingly, to attain a desired small amount of the gap between the circumferential edge of the magnetic disk and the inner surface of the exterior wall, it is necessary to cut and shape the surface facing the magnetic disk. In the meantime, there is a problem in the die-casting: formation of shrinkage cavities caused by shrinkage. The shrinkage cavities are tiny cavities formed inside the base formed by die-casting and causes leakage of low density gas. The shrinkage becomes larger as the wall becomes thicker and less uniform, so that the shrinkage cavities are likely be formed.

Shrinkage cavities are formed inside the base manufactured by die-casting, but not on the surface of the base. The dense layer of the surface is called a skin layer. The low density gas cannot pass through the skin layer so that the skin layer can prevent leakage of the low density gas. However, as in the above-description, when the inner surface of the base's exterior wall is cut, the skin layer is removed so that the inner layer with shrinkage cavities therein is exposed. This increases the possibility of leakage of the low density gas in the enclosure through the exterior wall to the outside.

BRIEF SUMMARY OF THE INVENTION

Embodiments of the present invention help to effectively suppress vibration of the disk of an HDD with low density gas sealed therein, and securely prevent leakage of the low density gas from the base. According to the embodiment of FIG. 3, helium gas is sealed in a hermetically sealed enclosure of an HDD, and a shroud 21 is formed integrally with a base 102. In manufacturing the base, a magnetic disk facing surface of the shroud is shaped by cutting after die-casting. This accomplishes a small and precise size of the gap between the magnetic disk facing surface and the circumferential edge of the disk. Cutting the shroud formed independently from the exterior walls 23a to 23d, which ensure the hermeticity with the shroud, suppresses the vibration of the magnetic disk and eliminates the necessity of cutting of the inner surfaces 232a to 232d of the exterior walls for the purpose of suppression of the vibration to reduce the risk of helium leakage.

DETAILED DESCRIPTION OF THE INVENTION

Figure 1:
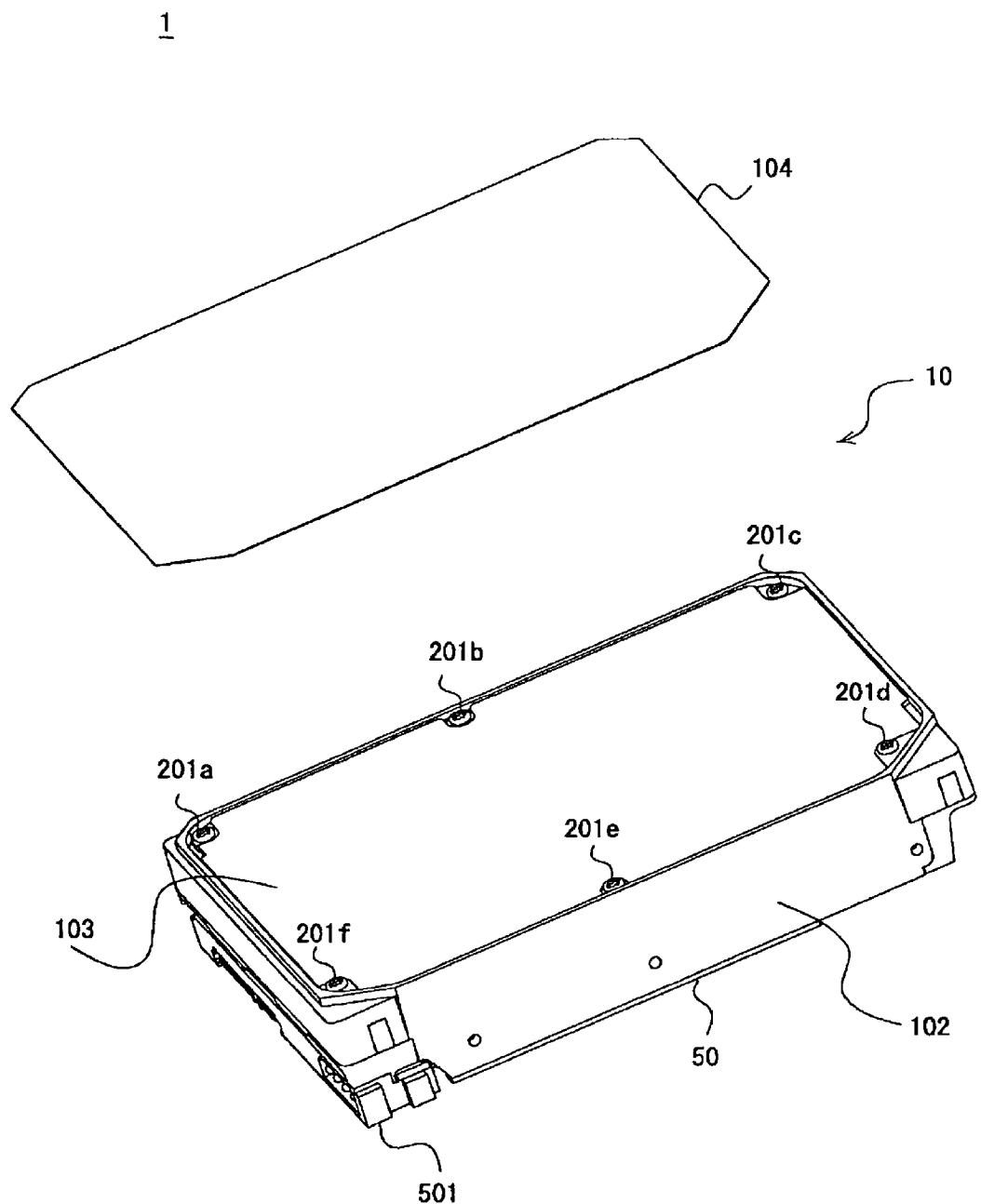
FIG. 1 is an exploded perspective view schematically depicting the configuration of a hermetically sealed HDD 1 according to an embodiment.

Embodiments of the present invention relate to a manufacturing method of a base and a manufacturing method of a disk drive device, and more particularly, relate to a manufacturing method of a disk drive device with low density gas sealed within a hermetically sealed enclosure thereof and a base to be used for the device.

An aspect of embodiments of the present invention is a manufacturing method of a base to be used in a disk drive device with low density gas sealed within a hermetically sealed enclosure. The manufacturing method forms a casting comprising a bottom, an exterior wall standing from the bottom so as to surround the periphery of the bottom to ensure hermeticity, and a shroud which is distant from the exterior wall in a space surrounded by the exterior wall by die-casting. It removes at least a part of a disk facing surface of the shroud formed by the die-casting by cutting. It maintains the surface formed by the die-casting without cutting at least a part of an inner area of the exterior wall where the disk facing surface is projected from the spinning center of a disk. Thereby, the manufacturing method may prevent leakage of the low density gas from the base more securely.

The surface formed by the die-casting may be maintained without cutting the whole area of the projected inner area of the exterior wall. Thereby, the manufacturing method may prevent leakage of the low density gas from the base more securely.

The whole area of the disk facing surface may be removed by cutting. Also, the disk facing surface may stand vertical from a bottom surface of the bottom. Thereby, the manufacturing method may suppress vibration of the disk caused by turbulence more effectively.

The surface may be formed by the die-casting be maintained without cutting an opposite surface of the disk facing surface. Thereby, the manufacturing method may improve the manufacturing efficiency of the base.

The surface may be formed by the die-casting be maintained without cutting an area other than a ramp arrangement surface in the inner surface of the exterior wall. Thereby, the manufacturing method accomplishes highly precise arrangement of the ramp and may prevent leakage of the low density gas from the base more securely.

Still further, the surface may be formed by the die-casting be maintained without cutting the whole inner surface area of the exterior wall. Thereby, the manufacturing method may prevent leakage of the low density gas from the base more securely.

A manufacturing method of a disk drive device according to another aspect of embodiments of the present invention manufactures a base by the above-described manufacturing method according to claim 1, secures an assembly of a disk, a head slider, and an actuator within the base, injects low density gas having density lower than air into an interior space of the base, and joins a cover to the base. Thereby, in a disk drive device having a hermetically sealed enclosure to seal in low density gas, the manufacturing method may suppress vibration of the disk caused by turbulence effectively and prevent leakage of the low density gas from the base may more securely.

In addition, a dust removal filter may be disposed in a space between the exterior wall on the opposite side of the disk across the shroud and the shroud. Thereby, the method may dispose a filter with high dust-removal capability within the enclosure.

In a disk drive device having a hermetically sealed enclosure to seal in low density gas, embodiments of the present invention may effectively suppress the vibration of the disk caused by turbulence and also prevent leakage of the low density gas from the base more securely.

Hereinafter, particular embodiments of the present invention will be described. For clarity of explanation, the following description and the accompanying drawings contain omissions and simplifications as appropriate. Throughout the drawings, like components are denoted by like reference numerals, and their repetitive description is omitted if not necessary for the sake of clarity. In the embodiments, a hard disk drive (HDD) will be described as an example of a disk drive device.

An HDD of the embodiments has a hermetically sealed enclosure and seal in low density gas having density lower than air within the enclosure. A typical low density gas is helium gas. Sealing in the low density gas within the enclosure reduces turbulence and windage loss for a magnetic disk and an actuator and achieves swift and accurate positioning control, power saving, and satisfactory quietness.

In the embodiments, a base constituting a part of the hermetically sealed enclosure has a shroud which is formed integrally with the base and has a surface curved along the circumference of a magnetic disk. The manufacture of the base of the embodiments cuts to shape the base after die-casting. Particularly, according to a feature of the embodiments, it cuts to shape the shroud surface facing the magnetic disk. Thereby, the gap between the shroud surface facing the magnetic disk and the circumferential edge of the magnetic disk is made small and accurate in size, so that the flutter vibration in spinning of the magnetic disk may be effectively suppressed.

In die-casting, a draft angle should be added to parts of the base to pull the base out of the mold. Accordingly, immediately after die-casting, the shroud surface facing the magnetic disk does not stand vertically from the base bottom but stands with a specific draft angle.

Consequently, the distance between the surface facing the magnetic disk and the circumferential edge of the magnetic disk is not uniform in the direction of a spindle shaft. Also, the distance between the surface facing the magnetic disk and the circumferential edge of the magnetic disk cannot be decreased. Cutting to shape the shroud surface facing the magnetic disk accomplishes a uniform distance between the surface facing the magnetic disk and the magnetic disk, so that the margin for the draft angle becomes unnecessary and the gap between the surface facing the magnetic disk and the magnetic disk may be reduced.

A feature of the embodiments is a presence of a space between the shroud and the exterior wall of the base (the exterior wall ensuring the hermeticity) so that the base of the embodiments has a structure in which the shroud is independent from the exterior wall. A problem in die-casting is formation of shrinkage cavities caused by shrinkage. The shrinkage cavities are tiny cavities formed inside the base made by die-casting and cause leakage of low density gas. If the wall is thicker and less uniform, the shrinkage increases so that the shrinkage cavities are likely to be formed.

Shrinkage cavities are formed inside the base manufactured by die-casting but are not formed on the base surface. The dense layer of the surface is called a skin layer. Since low density gas cannot pass through the skin layer, the presence of the skin layer may prevent leakage of the low density gas. However, if the inner surface of the base exterior wall is cut to shape, for example, the skin layer is removed and the inside layer with shrinkage cavities is exposed. This increases the possibility that the low density gas in the enclosure may leak to the outside through the exterior wall. Accordingly, the base of the embodiments having a space between the shroud and the exterior wall of the base (the exterior wall ensuring the hermeticity) according to the feature of the embodiments is advantageous to reduce the possibility of leakage because it has a structure in which the shroud is independent from the exterior wall.

Namely, manufacture of the base according to the embodiments cuts the shroud surface facing the magnetic disk to make the gap between the magnetic disk and the shroud smaller and uniform to suppress the flutter vibration of the magnetic disk. Accordingly, in the base of the embodiments, since the shroud and the exterior wall ensuring the hermeticity are formed independently as described above, even if the shroud surface is cut and the shrink cavities are exposed, the low density gas will not leak from the base through the exterior wall.

This forming of the shroud separated from the exterior wall and a space therebetween, instead of thickening the exterior wall and forming the shroud as a part of the base's exterior wall, leads to efficient suppression of the flutter vibration of the magnetic disk by cutting to shape the shroud, and it also eliminates the necessity of cutting the inner surface of the exterior wall, resulting in a smaller cut area on the inner surface of the exterior wall which allows reduction of the risk of the leakage of low density gas.

Hereinafter, the base of the embodiments and the manufacturing method thereof will be described more specifically. First, the entirety of the HDD of an embodiment will be outlined. FIG. 1 is an exploded perspective view schematically illustrating the configuration of a hermetically sealed HDD 1 according to an embodiment. The HDD 1 comprises a head disk assembly (HDA) 10 and a control circuit board 50 fixed to the outer bottom of the HDA 10. The control circuit board 50 has an interface connector 501 to an external host. The HDA 10 comprises a base 102, an inner cover 103, and an outer cover 104, which are main components of an enclosure. The inner cover 103 is secured to the base 102 via a gasket (not shown in FIG. 1) with screws 201a to 201f, and other components constituting the HDA 10 are housed in the interior space formed by the base 102 and the inner cover 103.

Figure 2:
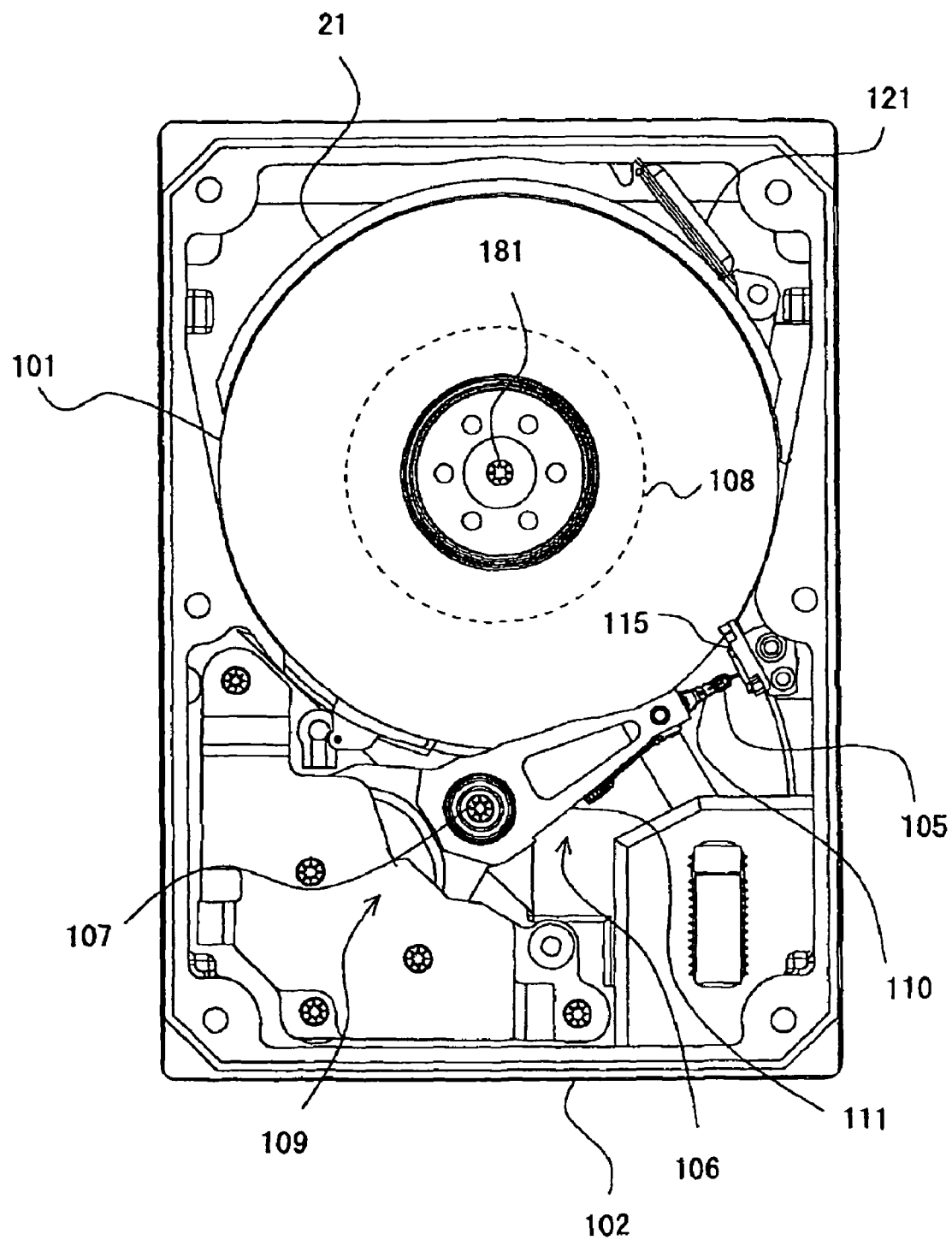
FIG. 2 is a top view depicting components of a base according to an embodiment, and shows an enclosure of the HDD with the top cover removed.

Referring to FIG. 2, explanation will be given on the components constituting the HDA 10. The operation of the components in the enclosure is controlled by a control circuit on the control circuit board 50. FIG. 2 is a top view depicting the components inside the base 102. A head slider 105 comprises a head element portion and a slider on which the head element portion is formed. The head element portion includes a recording element and/or a reproducing element. The head element portion accesses (reads out or writes) a magnetic disk 101 for storing data for data inputted from and outputted to the external host (not shown).

An actuator 106 holds and moves the head slider 105. The actuator 106 is rotatably held by a swing shaft 107 and driven by a voice coil motor (VCM) 109 as a driving mechanism. The assembly of the actuator 106 and the VCM 109 is a moving mechanism of the head slider 105. The actuator 106 comprises a suspension 110 and an arm 111 for supporting the suspension. The suspension 110 and the head slider 105 constitute a head gimbal assembly (HGA).

A magnetic disk 101 is spun about a spindle shaft 181 by a spindle motor (SPM) 108 at a specific angular rate. A shroud 21 is provided on the opposite side of the actuator 106 across the magnetic disk 101. The shroud 21 is continuously formed along the outer periphery of the magnetic disk 101 and formed integrally with the base 102. A dust removal filter 121 is placed between the shroud 21 and the base exterior wall. The airflow generated by the spin of the magnetic disk 101 passes through the dust removal filter 121 and dust in the enclosure is captured by the dust removal filter 121 so that the dust around the magnetic disk 101 is removed. The structure of the base 102 including the shroud 21 will be described later in detail.

To access the magnetic disk 101, the actuator 106 moves the head slider 105 to above the data area on the surface of the magnetic disk 101. The pressure induced by the air viscosity between the air bearing surface (ABS) of the slider facing the magnetic disk 101 and the spinning magnetic disk 101 balances the pressure applied by the suspension 110 toward the magnetic disk 101, so that the head slider 105 flies over the magnetic disk 101 with a specific gap.

When the magnetic disk 101 stops spinning, the actuator 106 is moved to a ramp 115. At this time, the head slider 105 is not above the magnetic disk but positioned outside the disk. In this regard, embodiments of the present invention may be applied to the contact start and stop (CSS) scheme where the head slider 105 is moved to park on a zone provided near the inner diameter of the magnetic disk 101 when the head slider 105 does not write or read data.

Returning to FIG. 1, the enclosure of the HDA 10 of the present embodiment is a hermetically sealed enclosure and the hermeticity is ensured by the base 102 and the outer cover 104. In the enclosure, low density gas with density lower than air is enclosed, which suppresses turbulence and windage loss caused by the spin of the magnetic disk 101 and the rotation of the actuator 106.

Hydrogen or helium could be the low density gas to be used, and helium which has a powerful effect, stability, and high safeness is optimum. Therefore, helium will be described below by way of example. The HDD 1 has a removable inner cover 103 and an outer cover 104 for preventing leakage of helium gas; these make rework in the manufacturing step easy and effectively prevent the helium gas from leaking out of the HDD 1 as a final product.

In manufacturing an HDD 1, components are manufactured individually and are assembled. Specifically, a manufactured head slider 105 is bonded to a manufactured suspension 110 to manufacture an HGA. Then, an arm 111 and a VCM coil are secured to the HGA to manufacture a head stuck assembly (HSA), which is an assembly of an actuator 106 and a head slider 105. In addition to the manufactured HSA, an SPM 108, a magnetic disk 101, and a dust removal filter 121 to absorb the dust in the enclosure are mounted in a manufactured base 102, and an inner cover 103 is secured to the base 102 with screws 201a to 201f. The embodiments have a feature in the manufacturing method of the base 102, which will be described later in detail.

The inner cover 103 is made of a plate material of stainless steel, aluminum, brass, or the like. A gasket is arranged along the whole periphery of the inner cover 103 to provide a structure which is capable of sealing in helium gas temporarily. After securing the inner cover 103 with screws 201a to 201f, helium gas is injected into the space formed by the inner cover 103 and the base 102. A control circuit board 50 is implemented with helium gas temporarily sealed in and an operation test of the HDD 1 is conducted. In this test step, the outer cover 104 has not been joined yet. The inner cover 103 is merely secured with screws 201a to 201f and may be removed easily, so that rework after the test step is not troublesome.

When the test step ends, helium gas is injected again into the space formed by the inner cover 103 and the base 102, and the outer cover 104 is joined to the base 102. The position with high possibility for the helium gas in the enclosure to leak is the joint section between the base 102 and the outer cover 104. To seal this position perfectly, the upper part of the side wall of the base 102 and the outer cover 104 are laser-welded or solder-joined. Welding may be used. In this way, the base 102 and the outer cover 104 ensure the hermeticity of the enclosure to the helium gas.

In laser-welding or solder-joining, the material of the base 102 and the outer cover 104 should be selected from the view points of its duration, reliability, and cost. For example, a base 102 formed by aluminum die-casting and an aluminum outer cover 104 shaped by pressing or cutting may be selected, or a base 102 formed by die-casting an aluminum alloy containing relatively small amount of copper and magnesium and an aluminum outer cover 104 formed by pressing or cutting may be selected.

Figure 3:
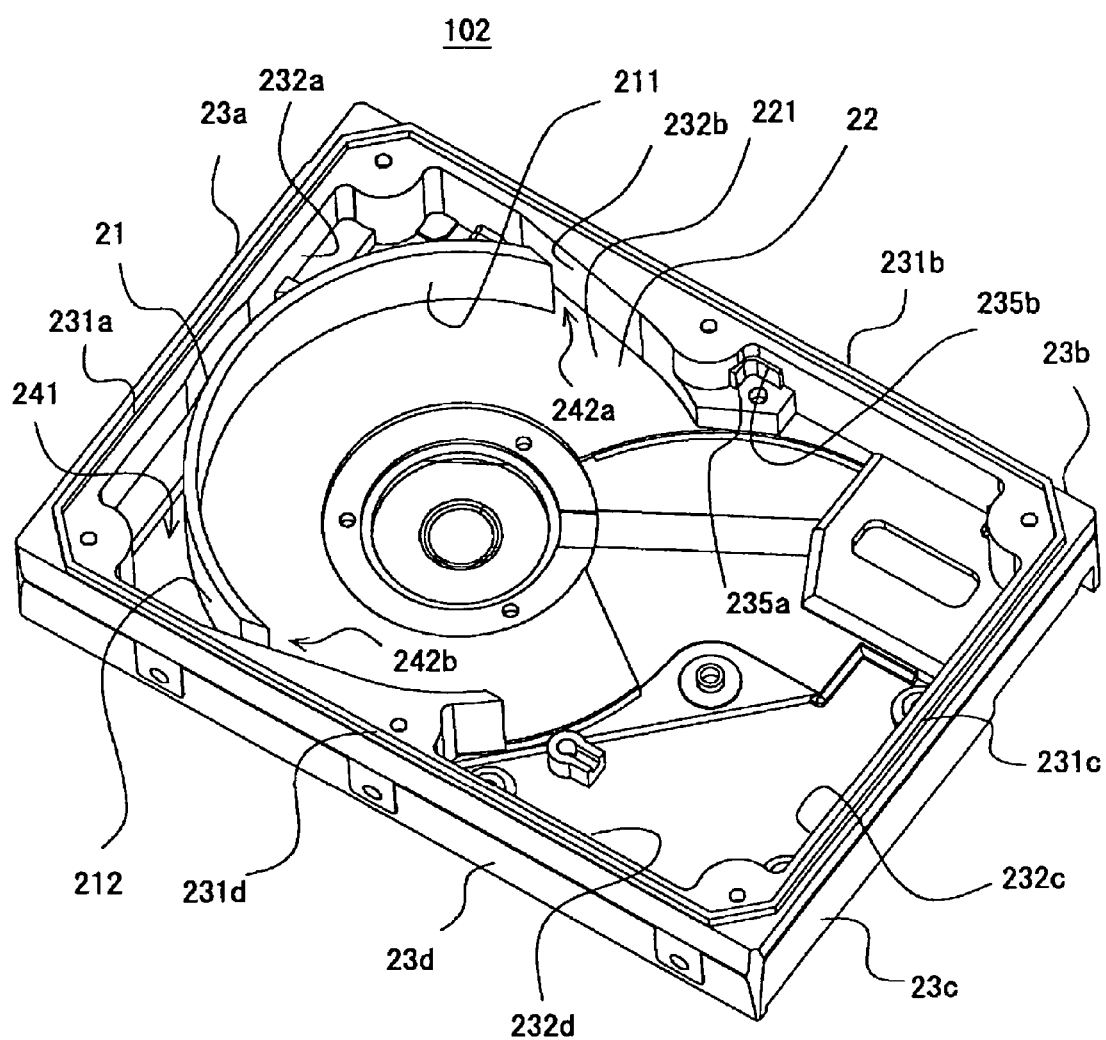
FIG. 3 is a perspective view depicting the structure of the base according to an embodiment.
Figure 4:
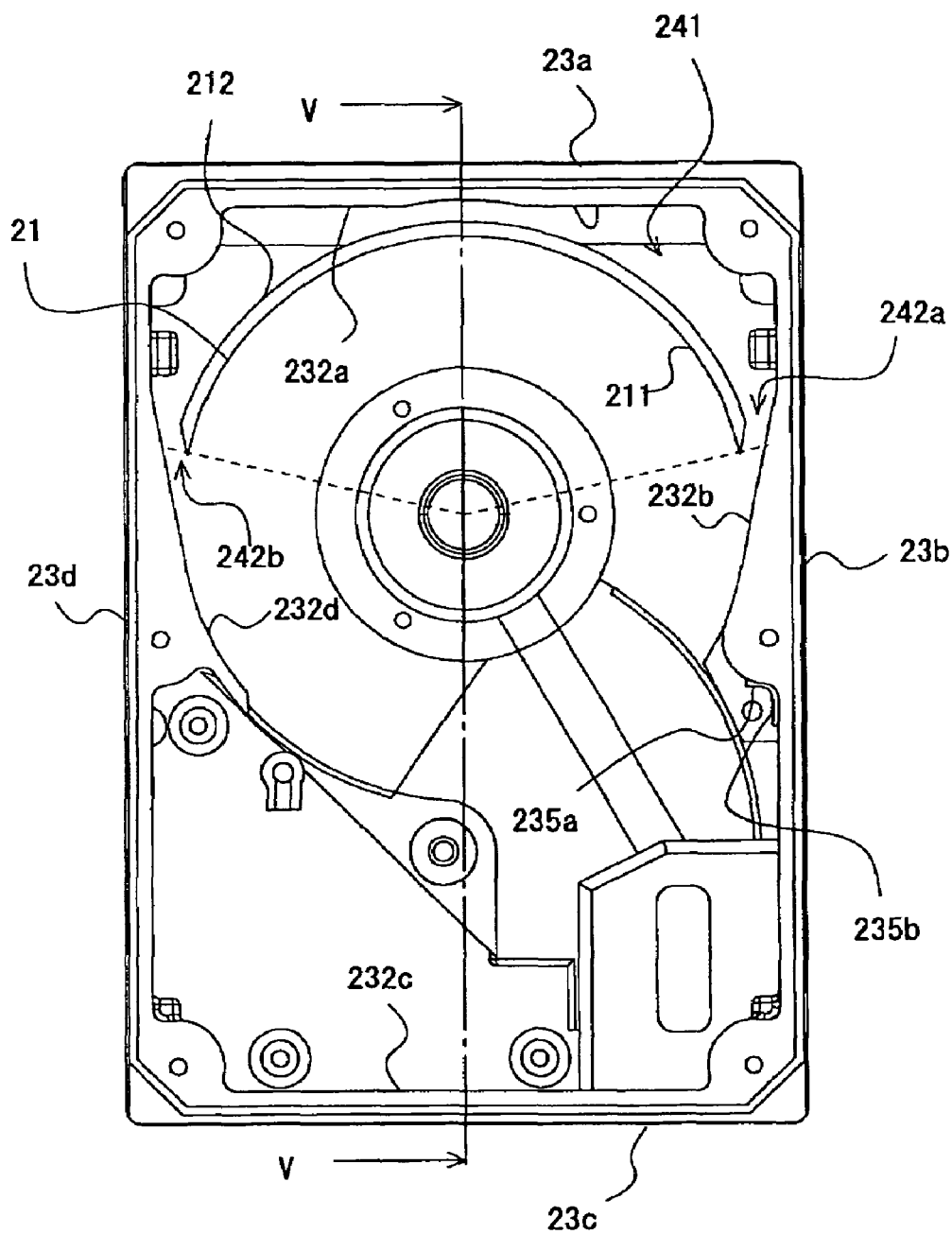
FIG. 4 is a plan view depicting the structure of the base according to an embodiment.

Hereinafter, the structure of the base 102 and the manufacturing method thereof will be described in detail. FIG. 3 is a perspective view depicting the structure of the base 102 and FIG. 4 is a plan view depicting the structure of the base 102. The base 102 is a box-like object and four exterior walls 23a to 23d are formed around a substantially rectangular bottom 22. The exterior walls 23a to 23d stand from the peripheral sides of the bottom of the base 102. The bottom 22 and the exterior walls 23a to 23d are formed integrally and formed continuously, so that there is no gap connecting the inside of the base to the outside.

On the top surface of the exterior walls 23a to 23d, ridges 231a to 231d are formed and the outer cover 104 is joined to the ridges 231a to 231d by welding. To ensure the hermeticity in the enclosure, the ridges 231a to 231d are continuous and surround the interior space of the base 102. Screw holes are provided in the inner areas of the ridges 231a to 231d to receive the screws 201a to 201f for securing the inner cover 103. In this way, the inner cover 103 is secured to the inner areas of the ridges 231a to 231d and the outer cover 104 is welded to the top surfaces of the ridges 231a to 231d so as to cover the inner cover 103.

On the bottom 221 of the base 102, a shroud 21 is formed. The shroud 21 is distant from the exterior wall 23a to 23d and is formed independent from the exterior walls 23a to 23d. The shroud 21 is located on the opposite side of the actuator 106 across the magnetic disk 101. The space 241 between the shroud 21 and the exterior wall 23a, the gap 242a between the shroud 21 and the exterior wall 23b, and the gap 242b between the shroud 21 and the exterior wall 23d are a flow channel of helium gas in the enclosure. In this regard, a part of the space 241 is a space between the shroud 21 and the exterior wall 23b or 23d, too.

Spin of the magnetic disk 101 allows the helium gas in the base 102 to enter the space 241 through the gap 242a. The helium gas passed through the space 241 flows toward the actuator 106 through the gap 242b. As described above, a dust removal filter 121 is provided within the space 241.

Between the exterior wall 23a on the opposite side of the magnetic disk 101 across the shroud 21 and the shroud 21, a larger space 241 compared with other areas in the base 102 is present and faster air flow is generated. Since helium gas is lighter than air, it is inferior to air with respect to dust collecting power, but the dust removal filter 121 having a larger dust collecting area may be arranged in the space 241 so that the deterioration in dust collecting performance by use of helium gas may be compensated for.

Figure 5:
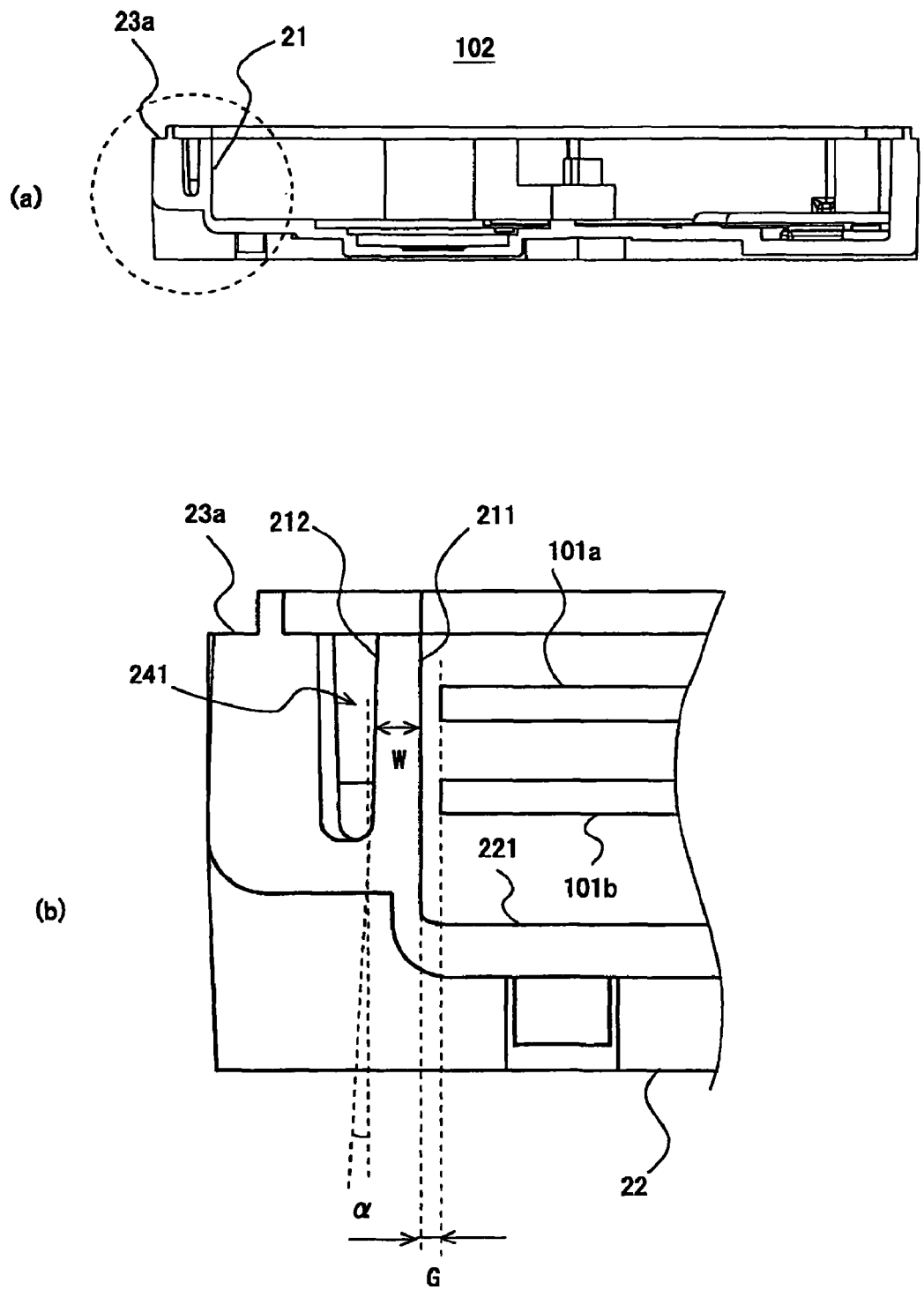
FIG. 5(a) is a cross-sectional view along the V-V section line in FIG. 4.
FIG. 5(b) is a partially enlarged view thereof.

The magnetic disk facing side 211 of the shroud 21 has an arc shape along the circumferential edge of the magnetic disk 101 and has a shape similar to the circumference of the magnetic disk 101. Thus, in the circumferential direction of the magnetic disk 101, the gap between the circumferential edge of the magnetic disk and the magnetic disk facing surface 211 of the shroud 21 is substantially uniform. FIG. 5(a) is a cross-sectional view along the V-V section line in FIG. 4. FIG. 5(b) is a drawing schematically depicting the cross-section of the shroud 21 and the positional relationship between the shroud 21 and the magnetic disks 101a and 101b, and is an enlarged view of the part surrounded by a dotted circle in FIG. 5(a).

As shown in FIG. 5(b), the magnetic disk facing surface 211 stands substantially vertical from the bottom 221 inside the base 102. Therefore, if the HDD 1 has a plurality of magnetic disks 101, the gap G between the circumferential edge of either of the magnetic disk 101a and 101b and the magnetic disk facing surface 211 is substantially the same as the other.

Compared with that the magnetic disk facing surface 211 of the shroud 21 stands substantially vertical from the bottom 221 of the base 102, the opposite side (back side) 212 of the magnetic disk facing surface 211 has a draft angle α with respect to the normal of the bottom 221. Specifically, the opposite surface 212 is tilted toward the magnetic disk facing surface 211 and the tilt angle is the draft angle α.

The base 102 of the embodiment may be manufactured by die-casting. To pull the base 102 out of the mold, the shroud 21 and the exterior walls 23a to 23d projecting from the bottom 22 of the base 102 have a specific draft angle. Besides, manufacturing precision in die-casting has a limit, so that the manufacture of a base cuts to shape a specific part of the base 102 after die-casting.

Specifically, the magnetic disk facing surface 211 of the shroud 21 is cut and shaped to have a draft angle of 0 degrees by removing the surface of the magnetic disk facing surface 211. In die-casting of the base 102, the mold is designed so that the gaps between the circumferential edges of the magnetic disks 101a and 101b and the magnetic disk facing surface 211 become the gap G.

Thereby, the magnetic disk facing surface 211 stands vertical from the bottom 221, so that the gap between the circumferential edge of each magnetic disk 101 and the magnetic disk facing surface 211 may be made a desired amount with high accuracy. The shroud 21 may be formed so that the gap between the circumferential edge of the magnetic disk 101 and the magnetic disk facing surface 211 is 0.30 mm or less, or from 0.15 mm to 0.33 mm.

In cutting to shape the magnetic disk facing surface 211 of the shroud 21, a cutting blade is moved from up to down being pressed against the magnetic disk facing surface 211, which in turn shaves off the magnetic disk facing surface 211. Specifically, the blade is moved toward the bottom 221 in the direction of the spindle shaft 181. Since the spindle shaft 181 and the swing shaft of the actuator 106 are parallel to the normal of the base 221, the magnetic disk facing surface 211 may be arranged substantially vertical to the bottom 221.

The whole area of the magnetic disk facing surface 211 may be substantially vertical to the bottom 221. To that end, at the initial position, the cutting blade is placed on the top surface of the shroud 21 and cuts to shape the whole surface of the magnetic disk facing surface 211. This enables the whole surface of the magnetic disk facing surface 211 to be substantially vertical to the bottom 221 more accurately. If the design allows, only a part of the magnetic disk facing surface 211 may be cut. Even in this case, compared with the case where the magnetic disk facing surface 211 is formed only by die-casting, a more precise amount may be attained for the gap between the magnetic disk facing surface 211 and the circumferential edge of the magnetic disk 101.

As shown in FIG. 5(b), the opposite surface 212 of the shroud 21 has a draft angle α. In one embodiment, the opposite surface 212 is not subjected to cutting, but the surface formed by die-casting is the surface. The opposite surface 212 does not face the magnetic disk 101 and merely defines the flow channel of helium gas, so that it does not need a highly precise shaping. This suppresses the deterioration in manufacturing efficiency of the base 102. To improve the manufacturing efficiency, the magnetic disk facing surface 211 may only be cut, and to allow the die-cast surfaces to be the surface of the shroud 21 without cutting the other surfaces including the opposite surface 212.

The opposite surface 212 of the shroud 21 has an arc shape along the magnetic disk facing surface 211. On cross-sections parallel to the bottom 221 of the base 102, the thickness W of the shroud 21 is uniform. This thickness is the size of the shroud 21 in the radial direction of the magnetic disk 101. Since the opposite surface 212 has a draft angle α, the thickness of the shroud 21 decreases little by little with the distance from the bottom 221 in the direction of the spindle shaft 181.

In this way, except for the effect of the draft angle, the thickness of the shroud 21 is uniform. In die-casting, the wall thickness suitable for the manufacture is present. For dense (with few shrinkage cavities) and more precise die-casting, the wall thickness may be a desired amount and uniform. The shroud 21 of the present embodiment has such a shape as described above and contributes to improve the die-casting performance.

In the base 102 of one embodiment, a wall for suppressing the flutter vibration of the magnetic disk 101 is formed on the shroud 21 which is away from the exterior walls 23a to 23d. Therefore, an advanced shaping is not required for the inner surfaces 232a to 232d of the exterior wall 23a to 23d to suppress the flutter vibration of the magnetic disk 101. The manufacture of the base in the present embodiment does not cut the area (shroud facing area) on the inner surfaces 232a to 232d of the exterior walls where the magnetic disk facing surface 211 of the shroud 21 is projected. This area is the continuous area which is defined by the two dotted lines among the inner surfaces 232a to 232c of the exterior walls in FIG. 4. Accordingly, the surface formed by die-casting is the surfaces of the area.

Since the cutting removes the dense surface layer formed by die-casting, shrinkage cavities of the inside may be exposed. The exterior walls 23a to 23d are the part to ensure the hermeticity, and exposure of the shrinkage cavities on the inner surfaces 232a to 232d increases the risk of leakage of helium gas from the base 102. Like the present embodiment, the shroud 21 formed independent from the exterior walls 23a to 23d to eliminate the necessity of cutting the exterior walls 23a to 23d for suppression of the flutter vibration of the magnetic disk 101 may reduce the possibility of the leakage of helium gas.

The shroud 21 formed independent from the exterior walls 23a to 23d allows the thickness of the exterior walls 23a to 23d to be the amount suitable for die-casting, which contributes to improvement in die-casting performance. Depending on designs, a part of the areas facing the shroud on the exterior walls 23a, 23b, and 23d may be cut and shaped. To suppress the possibility of leakage of helium gas as much as possible, however, the cut area on the inner surfaces 232a to 232d of the exterior walls may be small as possible and it is possible that no cut area be present. Accordingly, the whole area of the shroud facing area may not be cut after die-casting, but the die-cast surface remain to be the surface of the shroud facing area.

Similarly, to reduce the possibility of helium gas leakage as much as possible, the die-cast surface may be the surface of the whole area of the inner surfaces of the exterior walls 23a to 23d. However, there is a limit in processing accuracy of die-casting, and if the components are required to be arranged within the base 102 with highly accurate positioning, the arrangement surface requires high precision in cutting. Specifically, among the inner surfaces 232a to 232d of the exterior walls, the surfaces 235a and 235b on which a ramp 115 is arranged are cut and shaped. This is because that to perform a loading/unloading operation of the actuator 106 precisely, the ramp 115 also requires to be precisely positioned.

Therefore, the cut area on the inner surfaces 232a to 232d of the exterior wall may be the arrangement surfaces for the ramp 115 at most, and at least the other area should not be cut. Since a CSS type of HDD does not have a ramp, the surface of the whole area of the inner surfaces 232a to 232d of the exterior wall may be the surface formed by die-casting. This reduces the possibility of helium gas leakage to a smaller one.

Figure 6:
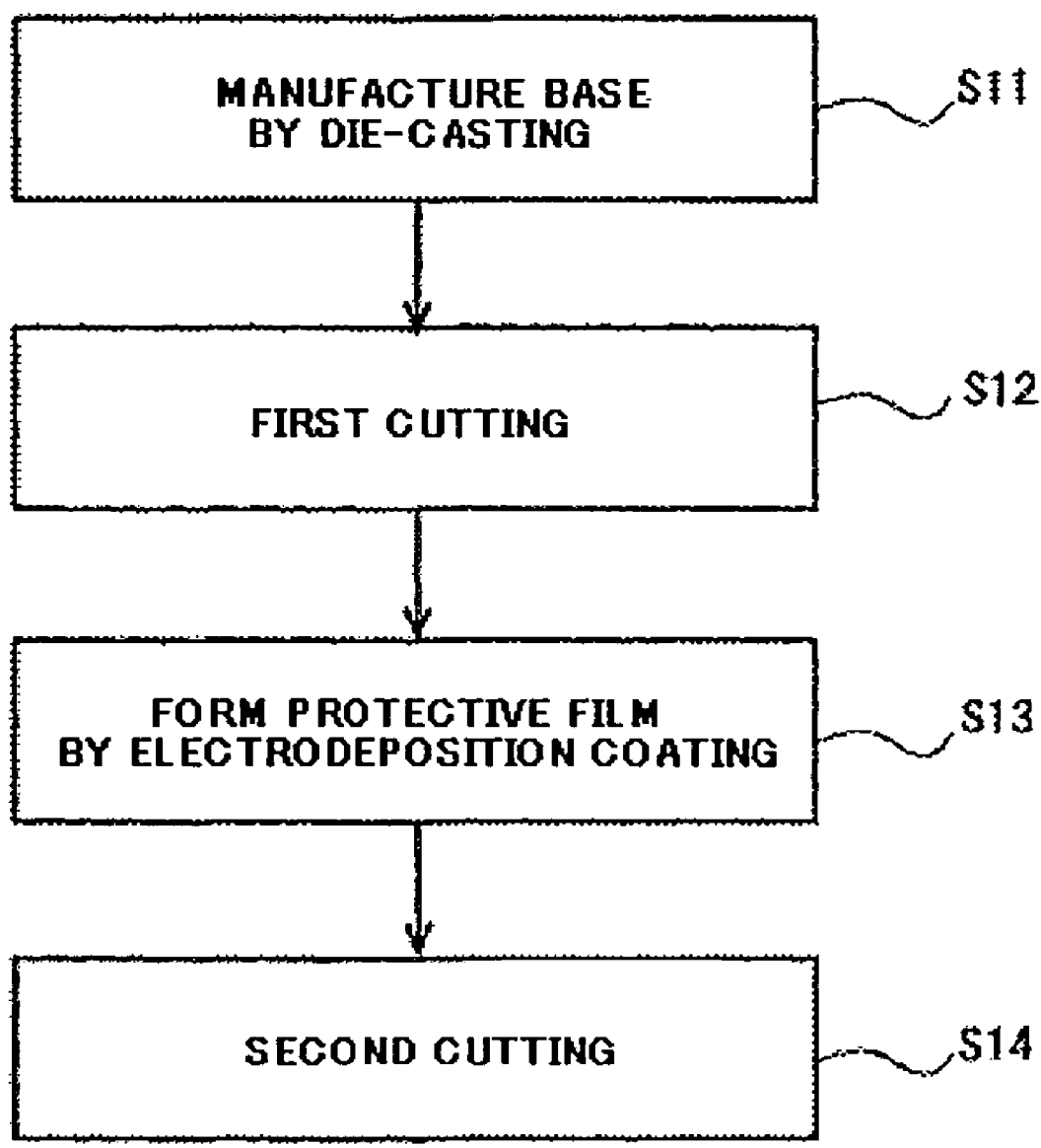
FIG. 6 is a flowchart illustrating the manufacturing steps of the base according to an embodiment.

Finally, manufacturing steps of the base 102 will be described with reference to the flowchart of FIG. 6. First, liquid aluminum or aluminum alloy is flown into a preliminarily prepared mold and a base of a casting (the base on the way of manufacture) is manufactured (S11). The cast base is released from the mold and a specific part is cut and shaped (S12). Specifically, the magnetic disk facing surface 211 of the shroud 21 is cut and shaped. Next, a protection film is formed on the cut base surface by electrodeposition coating (S13). Then, necessary area is cut and shaped (S14). Specifically, the arrangement surface of the SPM 108 on the bottom 221 and the ramp arrangement surfaces 235a and 235b are cut and shaped. Thereby, the base 102 to be implemented in an HDD is finished as a final product.

As set forth above, the present invention has been described by way of particular embodiments but is not limited to the above embodiments. A person skilled in the art may easily modify, add, and convert each element in the above embodiments within the scope of the present invention. For example, embodiments of the present invention are particularly useful in HDDs but may be applied to other types of disk drive devices. The shroud may have a single continuous magnetic disk facing surface on the opposite side of the actuator, but may also have a plurality of discrete magnetic disk facing surfaces, or the shroud may be formed at a different position from the above example.

What is claimed is:

1. A method of manufacturing a hermetically sealed enclosure for a hard disk drive; the method comprising:

forming a casting comprising a bottom, said bottom comprising an inner surface and an outer surface, an exterior wall standing from the bottom so as to surround the periphery of the bottom to ensure hermeticity of said enclosure, said exterior wall and said inner surface of said bottom forming a first inner cavity, wherein a portion of said first inner cavity is formed to be located proximate a radial edge of a magnetic disk, and forming a shroud which is distant from the exterior wall and within said first inner cavity; and removing at least a part of the shroud without altering said first inner cavity, forming a second cavity between said exterior wall and said shroud.

2. The method according to claim 1, wherein the first inner cavity formed by the casting is maintained without disrupting continuity of the exterior wall.

3. The manufacturing method according to claim 1, wherein a whole area of the disk facing surface is removed by cutting.

4. The manufacturing method according to claim 1, wherein the disk facing surface stands vertical from a bottom surface of the bottom.

* * * * *